US012168599B2

(12) United States Patent
Chang et al.

(10) Patent No.: US 12,168,599 B2
(45) Date of Patent: Dec. 17, 2024

(54) LIQUID DISPENSER HAVING IMMERSIVE MOTION GRAPHICS

(71) Applicant: AQUIVIO CO., LTD., Taipei (TW)

(72) Inventors: Yi-Hsuan Chang, Taipei (TW); Daniel Hill, Taipei (TW)

(73) Assignee: AQUIVIO CO., LTD., Taipei (TW)

( * ) Notice: Subject to any disclaimer, the term of this patent is extended or adjusted under 35 U.S.C. 154(b) by 148 days.

(21) Appl. No.: 17/974,505

(22) Filed: Oct. 26, 2022

(65) Prior Publication Data

US 2023/0136793 A1 May 4, 2023

(30) Foreign Application Priority Data

Nov. 2, 2021 (TW) ................................ 110212915

(51) Int. Cl.
*B67D 1/08* (2006.01)

(52) U.S. Cl.
CPC ......... *B67D 1/0872* (2013.01); *B67D 1/0888* (2013.01); *B67D 2210/00031* (2013.01)

(58) Field of Classification Search
CPC ................ B67D 1/0872; B67D 1/0888; B67D 2210/00031
See application file for complete search history.

(56) References Cited

U.S. PATENT DOCUMENTS 10,689,240 B1 * 6/2020 Schultz ................ B67D 1/0064
2009/0183796 A1 * 7/2009 Chase .................... B67D 1/001 141/95
2016/0340166 A1 * 11/2016 Broen ....................... F25C 5/20
2017/0101299 A1 * 4/2017 Dresser .................... B67D 1/00
2020/0031656 A1 * 1/2020 Rudick ................... G06F 3/013
2020/0140794 A1 * 5/2020 Lee ...................... B67D 1/0016
2020/0231426 A1 * 7/2020 Edwards .............. B67D 1/0888
2020/0288907 A1 * 9/2020 Braje .................... G07F 7/0893
2020/0290860 A1 * 9/2020 Lynch .................. B67D 1/0014
2021/0009402 A1 * 1/2021 Moskowitz .......... B67D 1/0888
2021/0171331 A1 * 6/2021 Wilson .................... G07F 9/023
2022/0024748 A1 * 1/2022 Fantappie ............ B67D 1/0074
2022/0144619 A1 * 5/2022 Otto ..................... B67D 1/0085
2023/0109097 A1 * 4/2023 Dorney .................. B67D 1/124 141/94
2023/0257246 A1 * 8/2023 Fantappie ............ B67D 1/0034 222/52
2023/0271820 A1 * 8/2023 Mulcahey ............ B67D 1/1247 222/148

* cited by examiner

*Primary Examiner* — Gary C Hoge
(74) *Attorney, Agent, or Firm* — Resonance IP Law, PC

(57) ABSTRACT

A liquid dispenser having immersive motion graphics is provided and includes a base portion, a display portion, a liquid supply portion and an electrical control portion, where the display portion is disposed in an accommodating space formed by the base portion, such that when the electrical control portion controls the liquid supply portion to inject a liquid into a target object located in the accommodating space, the electrical control portion simultaneously controls the display portion to display a motion graphic in the accommodating space to generate an interaction between the motion graphic and the liquid. Therefore, consumers can be informed of rich beverage information and be provided with an immersive experience via the display of the motion graphic.

14 Claims, 6 Drawing Sheets

LIQUID DISPENSER HAVING IMMERSIVE MOTION GRAPHICS

BACKGROUND

1. Technical Field

The present disclosure relates to a liquid dispenser, and more particularly, to a liquid dispenser having immersive motion graphics.

2. Description of Related Art

In today's society, liquid dispensers such as coffee machines, water dispensers, or beverage machines have become indispensable in people's lives. However, the existing liquid dispensers only provide consumers with simple information about drinks, such as the type of drinks, so consumers cannot be more interested in drinks or be further attracted to buy drinks.

Furthermore, with the improvement of consumers' concept of health, the existing liquid dispensers such as coffee machines, water dispensers and/or beverage machines can only provide simple information about beverages, but cannot further provide information regarding beverage ingredients (e.g., sugar, etc.), thereby reducing the willingness of consumers to buy beverages.

Therefore, how to overcome the various problems of the conventional liquid dispensers, so as to increase consumers' interest in purchasing beverages, thereby attracting consumers to purchase beverages, has become an urgent problem to be solved at present.

SUMMARY

In view of the aforementioned drawbacks of the prior art, the present disclosure provides a liquid dispenser having immersive motion graphics, which comprises: a base portion including a frame member with a liquid injection port and an accommodating space formed in the frame member, wherein the liquid injection port communicates with the accommodating space; a display portion disposed on the frame member, wherein the display portion is located in the accommodating space; and a liquid supply portion disposed on the base portion and having a pipe member connected to the liquid injection port for discharging a first liquid from the liquid injection port via the pipe member, wherein the display portion simultaneously displays a motion graphic in the accommodating space when the first liquid is injected from the liquid injection port into a target object disposed in the accommodating space and located in front of the display portion, such that the motion graphic interacts with the first liquid when the first liquid is injected into the target object.

In the aforementioned liquid dispenser having immersive motion graphics, the liquid dispenser having immersive motion graphics further comprises an electrical control portion disposed on the base portion and having a switch member and a scan member, wherein the switch member and the scan member are disposed on the frame member.

In the aforementioned liquid dispenser having immersive motion graphics, the electrical control portion is electrically connected to the liquid supply portion, wherein when the switch member is triggered, the electrical control portion notifies a liquid supply device to supply the first liquid to the liquid supply portion, and controls the liquid supply portion to inject the first liquid into the target object via the liquid injection port.

In the aforementioned liquid dispenser having immersive motion graphics, the electrical control portion is electrically connected to the liquid supply portion, wherein the electrical control portion notifies a liquid supply device to supply a plurality of second liquids to the liquid supply portion when the switch member is triggered, such that the plurality of second liquids are mixed in the liquid supply portion to obtain the first liquid, and the electrical control portion controls the liquid supply portion to inject the first liquid into the target object via the liquid injection port, and wherein the plurality of second liquids are respectively different liquids, or the plurality of second liquids are the same liquid.

In the aforementioned liquid dispenser having immersive motion graphics, the electrical control portion is electrically connected to the liquid supply portion, wherein when a two-dimensional barcode with a user information and a liquid information is scanned in the scan member, the electrical control portion decrypts the two-dimensional barcode to confirm whether the user information is correct and obtain the liquid information.

In the aforementioned liquid dispenser having immersive motion graphics, the electrical control portion is electrically connected to the liquid supply portion, wherein when a two-dimensional barcode with a user information and a liquid information is scanned in the scan member, the electrical control portion transmits the two-dimensional barcode to a cloud server, and the cloud server decrypts the two-dimensional barcode to confirm whether the user information is correct and obtain the liquid information, and the cloud server sends the liquid information back to the electrical control portion.

In the aforementioned liquid dispenser having immersive motion graphics, the electrical control portion notifies a liquid supply device to supply the first liquid to the liquid supply portion according to the liquid information, and the electrical control portion controls the liquid supply portion to inject the first liquid into the target object via the liquid injection port.

In the aforementioned liquid dispenser having immersive motion graphics, the electrical control portion notifies a liquid supply device to supply a plurality of second liquids to the liquid supply portion according to the liquid information, such that the plurality of second liquids are mixed in the liquid supply portion to obtain the first liquid, and the electrical control portion controls the liquid supply portion to inject the first liquid into the target object via the liquid injection port.

In the aforementioned liquid dispenser having immersive motion graphics, the electrical control portion is electrically connected to the display portion, wherein the electrical control portion controls the display portion to display the motion graphic when the first liquid is injected into the target object via the liquid injection port.

In the aforementioned liquid dispenser having immersive motion graphics, the liquid dispenser having immersive motion graphics further comprises a projection member disposed on the frame member and electrically connected to the electrical control portion, wherein when the first liquid is injected into the target object via the liquid injection port, the electrical control portion controls the projection member to project the motion graphic on the display portion, such that the display portion displays the motion graphic.

In the aforementioned liquid dispenser having immersive motion graphics, the liquid dispenser having immersive motion graphics further comprises a casing disposed on the base portion to protect the display portion, the liquid supply portion and the electrical control portion.

In the aforementioned liquid dispenser having immersive motion graphics, the motion graphic is an animation showing a rise of a liquid level of the first liquid, or the motion graphic displays liquid ingredients of the first liquid, a liquid injection amount and/or a health reminder via images and/or text.

In the aforementioned liquid dispenser having immersive motion graphics, the frame member further has a plurality of inner walls and another display portion disposed on the plurality of inner walls, wherein the another display portion and the display portion simultaneously display the motion graphic in the accommodating space when the first liquid is injected into the target object from the liquid injection port.

In the aforementioned liquid dispenser having immersive motion graphics, the target object is a material with light-transmitting and/or light-guiding properties, such that the motion graphic is able to pass through the target object and be displayed in the accommodating space.

It can be seen from the above that the liquid dispenser having the immersive motion graphics of the present disclosure displays the motion graphics in the display portion located in the accommodating space when the liquid is injected into the target object, so as to make the motion graphics interact with the liquid. In addition to displaying rich colors or geometric figures to further enhance the visual effect, the motion graphics can also display the corresponding nutrients (e.g., ingredients) in accordance with the water outlet process or the type of beverage. Moreover, consumers can be informed of rich beverage information and be provided with an immersive experience via the display of motion graphics.

DETAILED DESCRIPTIONS

The following describes the implementation of the present disclosure with embodiments. One skilled in the art can easily understand the other advantages and effects of the present disclosure from the content disclosed in this specification.

It should be understood that, the structures, ratios, sizes, and the like in the accompanying figures are used to illustrate the content disclosed in the present specification for one skilled in the art to read and understand, rather than to limit the conditions for practicing the present disclosure. Any modification of the structure, alteration of the ratio relationship, or adjustment of the size without affecting the possible effects and achievable proposes should still fall in the range compressed by the technical content disclosed in the present specification. Meanwhile, terms such as "upper," "lower," "a," "an," "one," and the like used herein are merely used for clear explanation rather than limiting practical range by the present disclosure, and thus, the alteration or adjustment of relative relationship thereof without essentially altering the technical content should be considered in the practical scope of the present disclosure.

Figure 1:
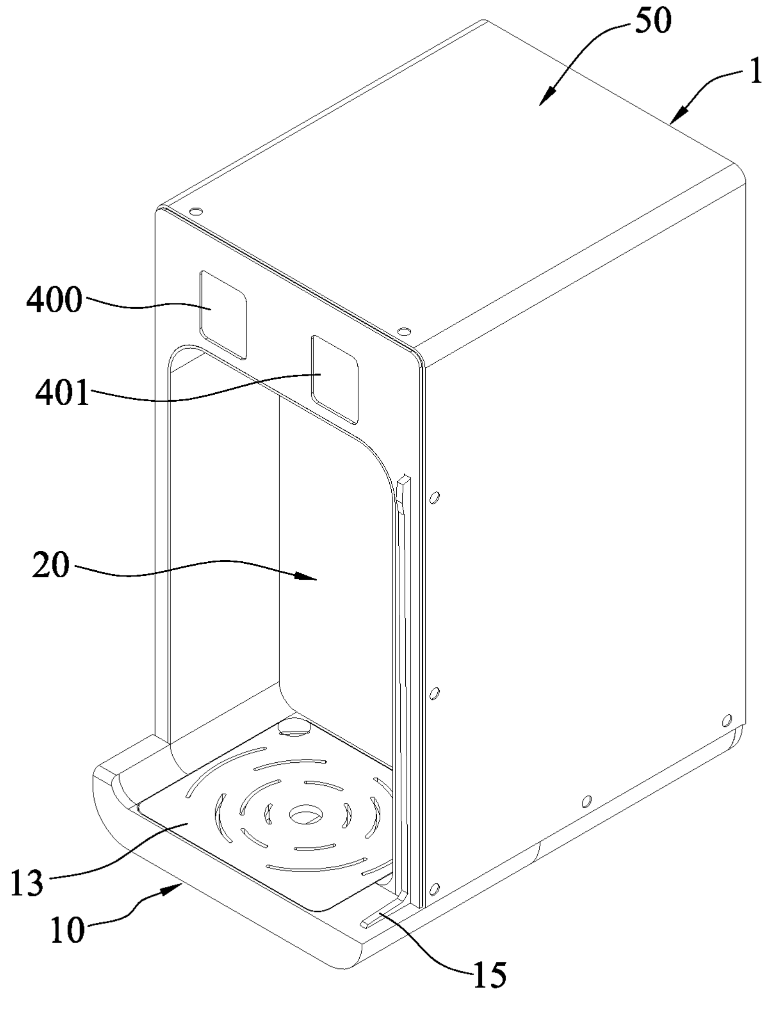
FIG. 1 is a schematic three-dimensional structure view of a liquid dispenser having immersive motion graphics according to the present disclosure.
Figure 2:
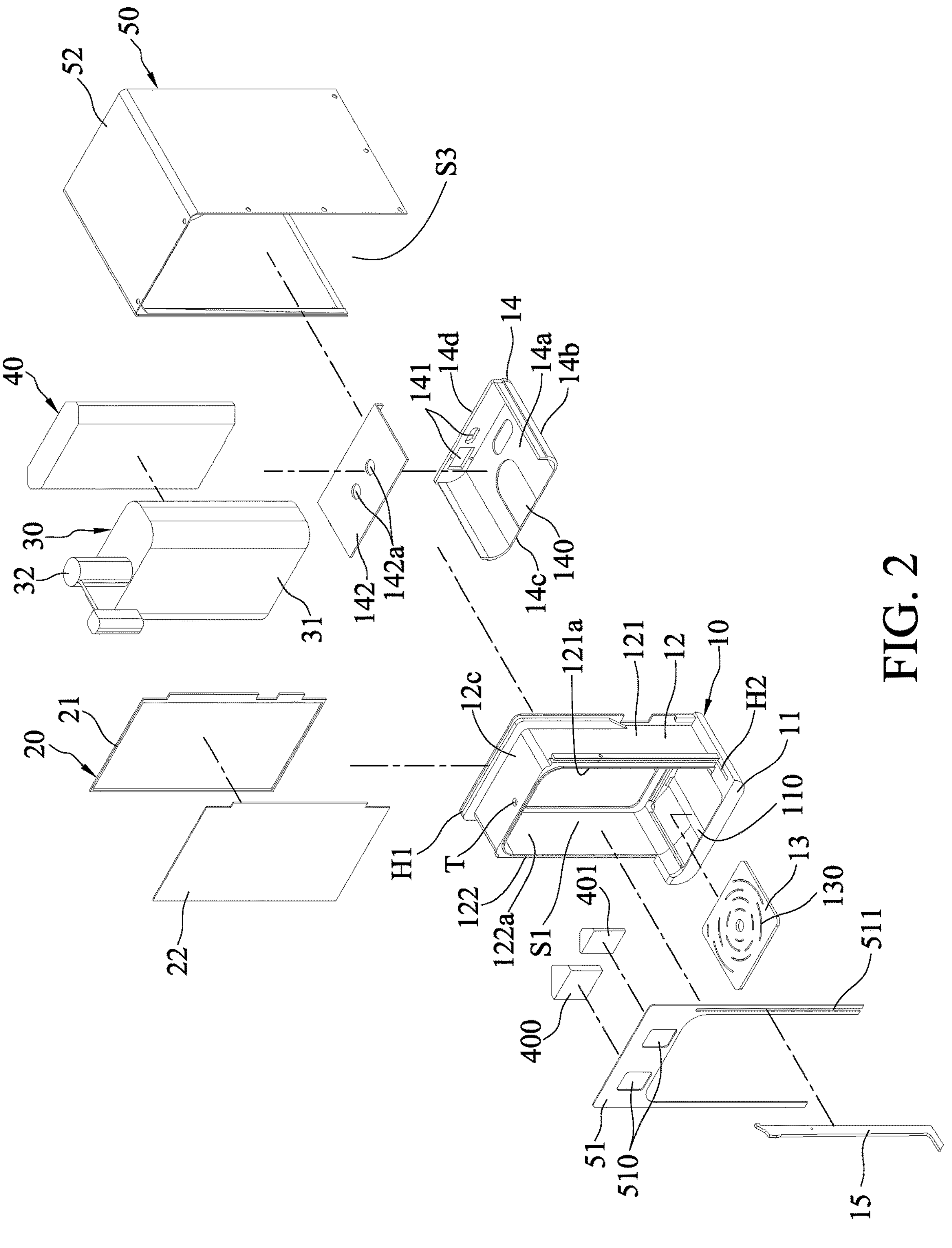
FIG. 2 is a schematic exploded view of the liquid dispenser having immersive motion graphics according to the present disclosure.

FIG. 1 and FIG. 2 are schematic three-dimensional structure views of a liquid dispenser 1 having immersive motion graphics of the present disclosure. The liquid dispenser 1 having immersive motion graphics comprises: a base portion 10, a display portion 20, a liquid supply portion 30, an electrical control portion 40 and a casing 50.

The base portion 10 includes a front base 11, a frame member 12 disposed on the front base 11, an object holder (e.g., a cup holder) 13 having a plurality of drain holes 130, and a rear base 14 disposed on one side of the front base 11.

Figure 3A:
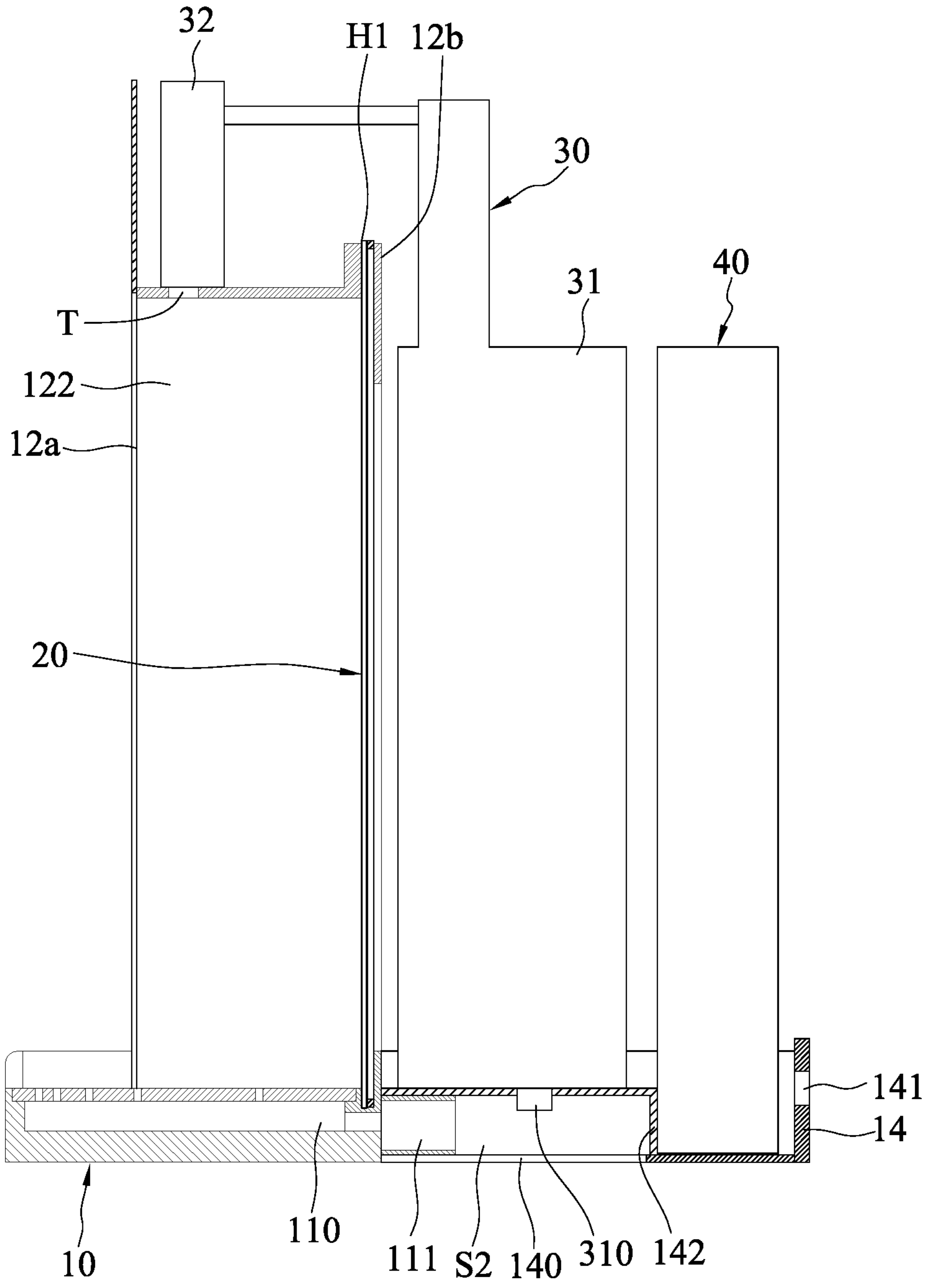
FIG. 3A and FIG. 3B are schematic cross-sectional views of the liquid dispenser having immersive motion graphics according to the present disclosure.

In one embodiment, as shown in FIG. 3A, the front base 11 has a drain groove 110 and a drain outlet 111 communicating with the drain groove 110, and the object holder 13 is covered above the front base 11, so that the plurality of drain holes 130 are connected to the drain groove 110, such that the liquid can flow into the drain groove 110 via the plurality of drain holes 130, and then the liquid is discharged via the drain outlet 111.

Furthermore, the frame member 12 has a first frame leg 121 and a second frame leg 122 corresponding to each other, and has a front and rear corresponding first side 12*a* and a second side 12*b*, where the frame member 12 is in the shape of "ㄇ" structure. In addition, a first fixing groove H1 is formed along the second side 12*b* of the frame member 12, wherein the frame member 12 is erected on the front base 11 via the first frame leg 121 and the second frame leg 122 thereof, so that a first accommodating space S1 is formed between the frame member 12 and the front base 11, and a portion of the object holder 13 is located in the first accommodating space S1.

Also, the rear base 14 has an upper surface 14*a* and a lower surface 14*b* corresponding to each other and a first side surface 14*c* and a second side surface 14*d* corresponding to each other, and an L-shaped support member 142 with a plurality of through holes 142*a* is provided on the upper surface 14*a* of the rear base 14, so that a second accommodating space S2 is formed between the support member 142 and the rear base 14, and the lower surface 14*b* of the rear base 14 has a pipeline port 140 and the second side surface 14*d* has a plurality of connection ports 141, such that the second accommodating space S2 communicates with the pipeline port 140 and the plurality of through holes 142*a* of the support member 142, wherein the rear base 14 is connected to the front base 11 via its first side surface 14*c*, so that the drain outlet 111 of the front base 11 is inserted into the second accommodating space S2, and the drain outlet 111 is connected to the pipeline port 140 of the rear base 14. For example, the drain outlet 111 of the front base 11 can be connected to an external pipeline (not shown) via the pipeline port 140 of the rear base 14, so that the liquid flows through the drain outlet 111 and then is discharged from the external pipeline.

Figure 3B:
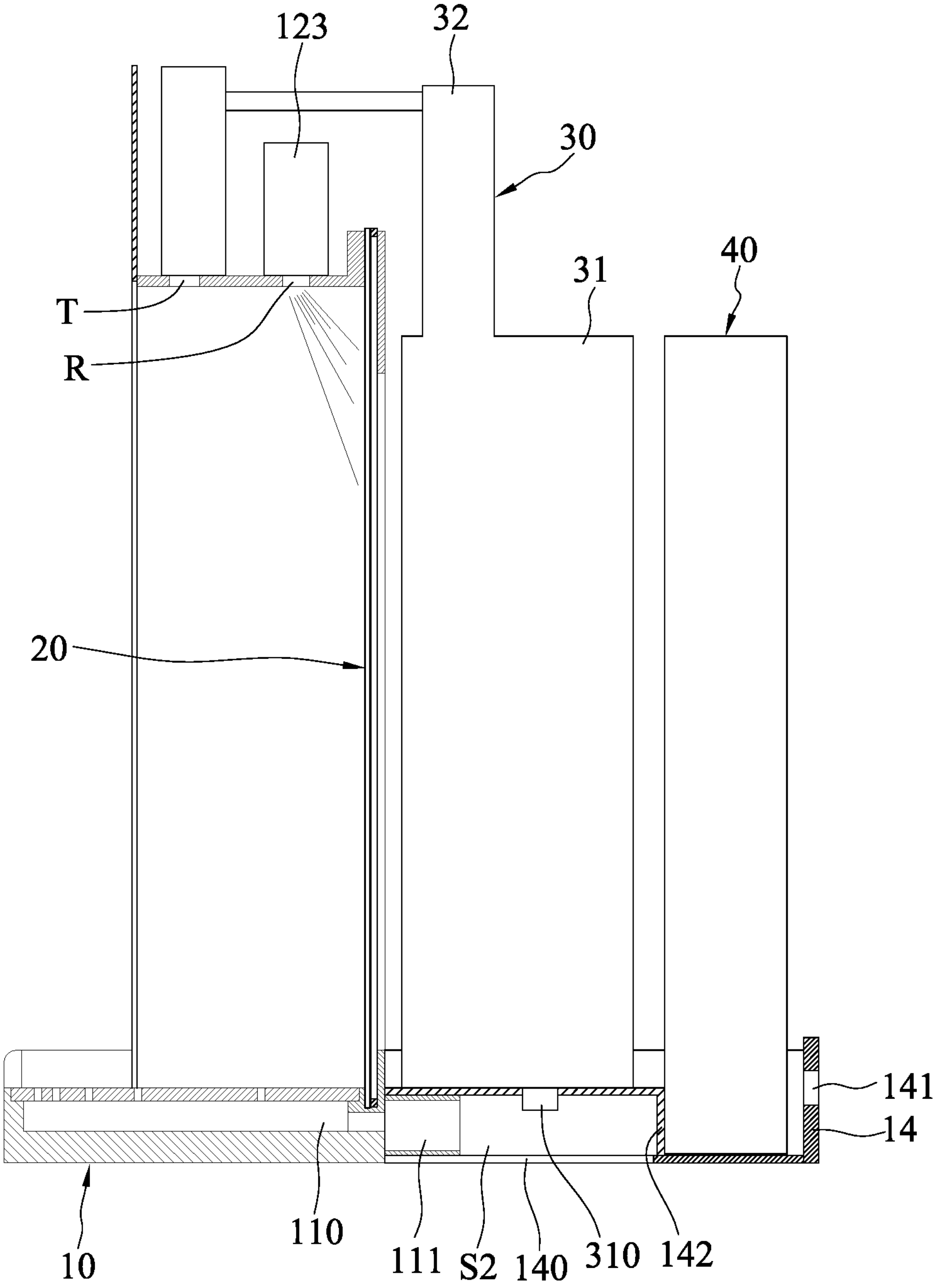

In one embodiment, the frame member 12 further has a top surface 12*c*, and a liquid injection port T is formed on the top surface 12*c*. In another embodiment, as shown in FIG. 3B, an opening R is further formed on the top surface 12*c*, and a projection member 123 is disposed corresponding to the opening R, so as to project the motion graphics via the opening R into the first accommodating space S1 via the projection member 123.

In one embodiment, the front base 11 and the first frame leg 121 of the frame member 12 are further provided with a second fixing groove H2, so as to use the second fixing groove H2 to set a warning light bar 15, in order to notify the user of the liquid temperature, liquid type and other information via the warning light bar 15, but the present disclosure is not limited to as such. For example, when the temperature of the liquid flowing out from the liquid injection port T is high, the warning light bar 15 emits a red light; when the temperature of the liquid flowing out from the liquid injection port T is low, the warning light bar 15 emits a blue light; or when the liquid flowing out from the liquid injection port T is juice, it can emit a light according to the color of the fruit corresponding to the juice.

The display portion 20 includes a display member 21 and a cover member 22 covering on the display member 21, so that the cover member 22 protects the display member 21 from being splashed by liquid, and the display portion 20 is inserted through the first fixing groove H1 of the frame member 12, wherein the display portion 20 communicates with the first accommodating space S1 via the cover member 22 thereof.

In one embodiment, the display member 21 includes but is not limited to display screens such as LED screens, OLED screens, Mini LED screens, etc., and the cover member 22 is a flat transparent and/or translucent structure (e.g., in the form of a flat plate), so that the motion graphics generated by the display member 21 is passing through the cover member 22 and displayed in the first accommodating space S1, so as to form an integrated visual experience and provide the user with an immersive experience. In addition, the display portion 20 can also be a projection screen.

In one embodiment, inner walls 121*a* and 122*a* of the first frame leg 121 and the second frame leg 122 of the frame member 12 may also be provided with another display portion (not shown), so that the another display portion disposed on the inner walls 121*a*, 122*a* can display motion graphics together with the display portion 20, wherein the another display portion includes, but is not limited to, a display screen such as an LED screen, an OLED screen, a Mini LED screen, etc., or a projection screen.

In one embodiment, the projection member 123 on the frame member 12 can project the motion graphics to the display portion 20 such as a projection screen and another display portion, in order to make the display portion 20 and/or another display portion display the motion graphics in the first accommodating space S1.

The liquid supply portion 30 includes a liquid supply member 31 having one or a plurality of nozzles 310 and a pipe member 32 communicating with the liquid supply member 31, wherein the liquid supply portion 30 is disposed on the support member 142 of the rear base 14, and the plurality of nozzles 310 of the liquid supply portion 30 penetrate through the plurality of through holes 142*a* of the support member 142 to communicate with the pipeline port 140 of the rear base 14, and one end of the pipe member 32 is connected to the liquid injection port T of the frame member 12, so that the liquid flows from the liquid supply member 31 through the pipe member 32, and then flows out from the liquid injection port T.

In one embodiment, the liquid supply member 31 has a liquid storage tank, a structure for mixing liquid (such as a stirrer), and a pump structure (not shown) for discharging the liquid from the liquid storage tank, wherein one or more liquids can flow into the liquid supply member 31 via one or the plurality of nozzles 310 of the liquid supply member 31, and can make the plurality of liquids mixed in the liquid supply member 31, and the liquid supply portion 30 then injects the mixed liquid into a target object 9 (e.g., the cup shown in FIG. 4A) via the pipe member 32 and the liquid injection port T.

The electrical control portion 40 is disposed on the upper surface 14*a* of the rear base 14, and is electrically connected to the projection member 123, the warning light bar 15, the display portion 20 and the liquid supply portion 30, and has a switch member 400 and a scan member 401, wherein a portion of the electrical control portion 40 is exposed from the plurality of connection ports 141 of the rear base 14, so that a power cable or signal transmission line (such as a network cable, etc.) is connected to the electrical control portion 40, and the switch member 400 and the scan member 401 are arranged on the top surface 12*c* of the frame member 12 and are also electrically connected to the electrical control portion 40.

In one embodiment, the electrical control portion 40 may be composed of elements or modules such as a battery, a relay, a circuit board, a communication module, and an electronic control module, wherein the communication module is a Bluetooth module, a Wi-Fi module, or a wireless network communication module, etc., and the electronic control module is a single-chip microcontroller that can be programmed, such as arduino, etc., or a computing device with elements such as a central processing unit (CPU), a memory, etc., but the present disclosure is not limited to as such.

In one embodiment, the switch member 400 is composed of a switch or a plurality of switches, so that when the switch member 400 is triggered, the electrical control portion 40 notifies an external liquid supply device (not shown) to supply a first liquid, so that the first liquid flows through one of the plurality of nozzles 310 of the liquid supply portion 30 via the pipeline, and then flows into the liquid supply member 31 of the liquid supply portion 30; alternatively, the electrical control portion 40 can notify the external liquid supply device to supply a plurality of second liquids, so that the plurality of second liquids flow respectively through the plurality of nozzles 310 of the liquid supply portion 30 via the pipeline, and then flow into the liquid supply member 31 of the liquid supply portion 30 for mixing to obtain the first liquid, wherein the plurality of second liquids are respectively different liquids, or the plurality of second liquids are the same liquid.

Furthermore, the electrical control portion 40 controls the liquid supply member 31 to discharge the first liquid from the liquid injection port T on the frame member 12, so that the first liquid is injected into a target object 9 (e.g., the cup shown in FIG. 4A) located on the object holder 13 and in the first accommodating space S1.

At this time, the electrical control portion 40 controls the display portion 20 located behind the target object 9 (or another display portion located on both sides of the target object 9) to display the motion graphics in the first accommodating space S1, or the electrical control portion 40 controls the projection member 123 to project the motion graphics on the display portion 20 (or another display portion) (as shown in FIG. 3B), so as to display the motion graphics in the first accommodating space S1, so that when the first liquid is injected into the target object 9, the motion graphics are displayed together. The interaction between the motion graphics displayed in the first accommodating space S1 and the first liquid are integrated into the display portion 20 (or another display portion), so that the motion graphics display the animation of the rising water level of the first liquid, or that the motion graphics display the liquid ingredients (e.g., the liquid compositions) of the first liquid, the liquid injection amount, and the health reminder via images and/or text, thereby forming an integrated visual experience and providing the user with an immersive experience.

In one embodiment, the switch member 400 can be a push button switch, a proximity switch, a touch switch, etc., but is not limited to as such.

In one embodiment, the scan member 401 is used to scan a two-dimensional barcode (such as a QR code) with user information and liquid information, so as to transmit the scanned two-dimensional barcode to the electrical control portion 40, in order to decrypt the two-dimensional barcode by the electrical control portion 40, and confirm whether the user information is correct and obtain the liquid information; alternatively, the electrical control portion 40 transmits the two-dimensional barcode to a cloud server (not shown) via a wired network or a wireless network, so that the cloud server decrypts the two-dimensional barcode, confirms whether the user information is correct and obtains the liquid information, and then sends the liquid information back to the electrical control portion 40. It should be understood that decrypting the two-dimensional barcode via the cloud server can further protect the user's information security, thereby avoiding the concern of personal information leakage.

Furthermore, when the electrical control portion 40 obtains the liquid information, the electrical control portion 40 notifies an external liquid supply device (not shown) to supply the first liquid according to the liquid information, so that the first liquid flows through one of the plurality of nozzles 310 of the liquid supply portion 30 via the pipeline, and then flows into the liquid supply member 31 of the liquid supply portion 30; alternatively, the electrical control portion 40 can notify the external liquid supply device to supply a plurality of second liquids, so that the plurality of liquids flow respectively through the plurality of nozzles 310 of the liquid supply portion 30 via the pipeline, and then flow into the liquid supply member 31 of the liquid supply portion 30, so that the plurality of second liquids are mixed in the liquid supply member 31 to obtain the first liquid, wherein the plurality of second liquids are respectively different liquids, or the plurality of second liquids are the same liquid. Furthermore, the electrical control portion 40 controls the liquid supply portion 30 to inject the first liquid into the target object 9 via the pipe member 32 and the liquid injection port T.

At this time, the electrical control portion 40 controls the display portion 20 located behind the target object 9 (or another display portion located on both sides of the target object 9) to display motion graphics in the first accommodating space S1, or the electrical control portion 40 controls the projection member 123 to project the motion graphics on the display portion 20 (or another display portion), so as to display the motion graphics in the first accommodating space S1, so that when the first liquid is injected into the target object 9, the motion graphics are displayed together. The interaction between the motion graphics displayed in the first accommodating space S1 and the first liquid is integrated into the display portion 20 (or another display portion), so that the motion graphics display the animation of the rising water level of the first liquid, or that the motion graphics display the liquid ingredients of the first liquid, the liquid injection amount, and the health reminder via images and/or text, thereby forming an integrated visual experience and providing the user with an immersive experience.

In another embodiment, the electrical control portion 40 counts the time when the first liquid is injected into the target object 9, so that when the electrical control portion 40 determines that the time when the first liquid is injected into the target object 9 reaches a preset time, the electrical control portion 40 controls the liquid supply portion 30 to stop operating.

The casing 50 includes a front casing 51 and a rear casing 52 having a third accommodating space S3, where the rear casing 52 is sleeved on the base portion 10, and the front casing 51 is disposed on the first side 12_a_ of the frame member 12 and engages with the rear casing 52, so that the display portion 20, the liquid supply portion 30 and the electrical control portion 40 are arranged in the third accommodating space S3, thereby protecting the display portion 20, the liquid supply portion 30 and the electrical control portion 40 via the casing 50.

In one embodiment, the material of the casing 50 includes but is not limited to metal, plastic, etc., such as: polystyrene (PS), high impact polystyrene (HIPS), acrylonitrile butadiene styrene (ABS) resin, stainless steel, iron, copper or its alloys, etc., wherein the front casing 51 has a plurality of openings 510 corresponding to the switch member 400 and the scan member 401, and a slot 511 corresponding to the warning light bar 15, so that the switch member 400 and the scan member 401 are exposed from the outside of the front casing 51 via the plurality of openings 510, and the warning light bar 15 is exposed from the outside of the front casing 51 via the slot 511.

In one embodiment, when the switch member 400 is a touch switch, it is not necessary to form an opening 510 corresponding to the switch member 400 in the front casing 51, so that the switch member 400 is disposed to be directly attached to the front casing 51.

Figure 4A:
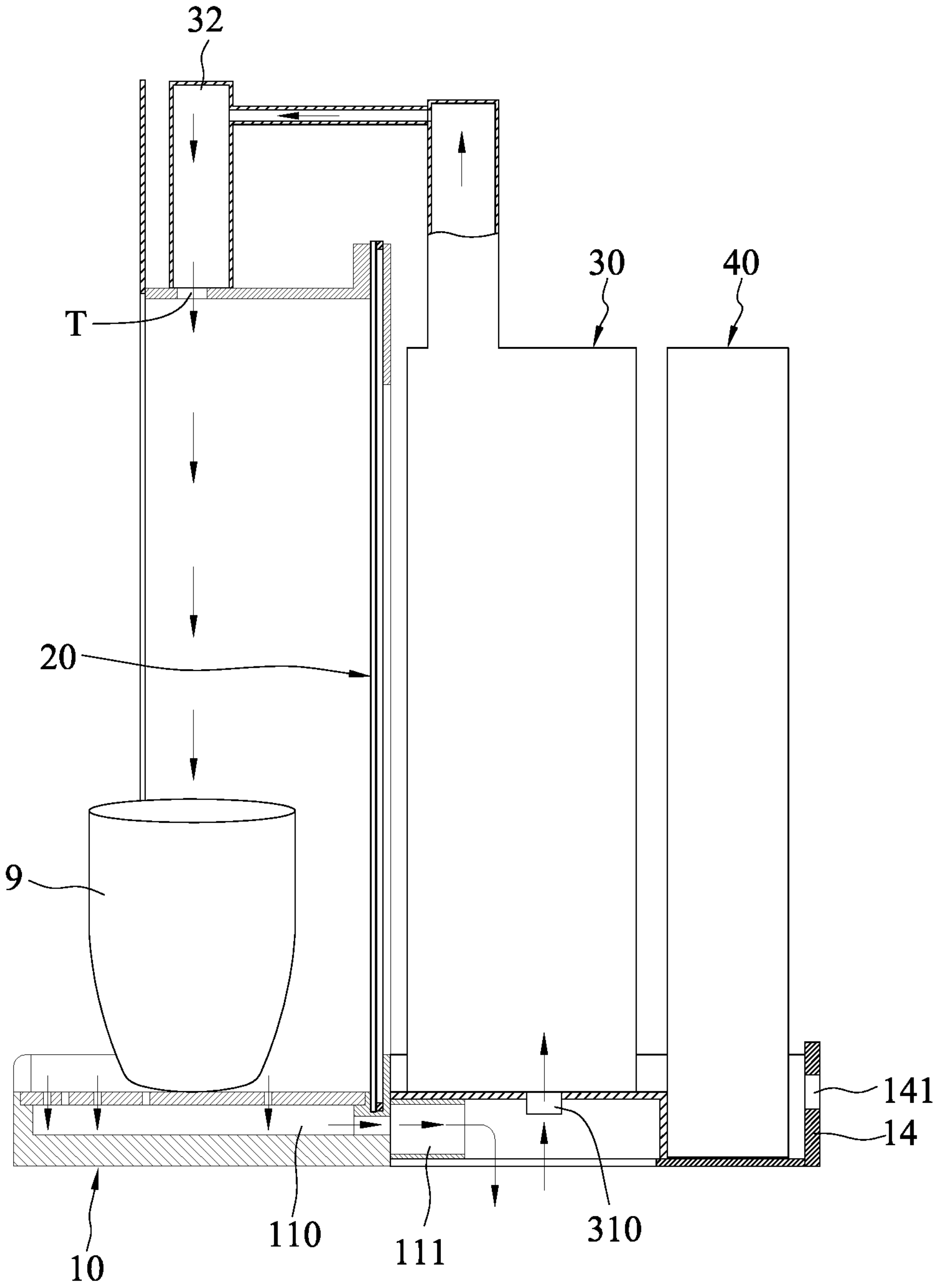
FIG. 4A and FIG. 4B are schematic cross-sectional views illustrating the operations of the liquid dispenser having immersive motion graphics according to the present disclosure.
Figure 4B:
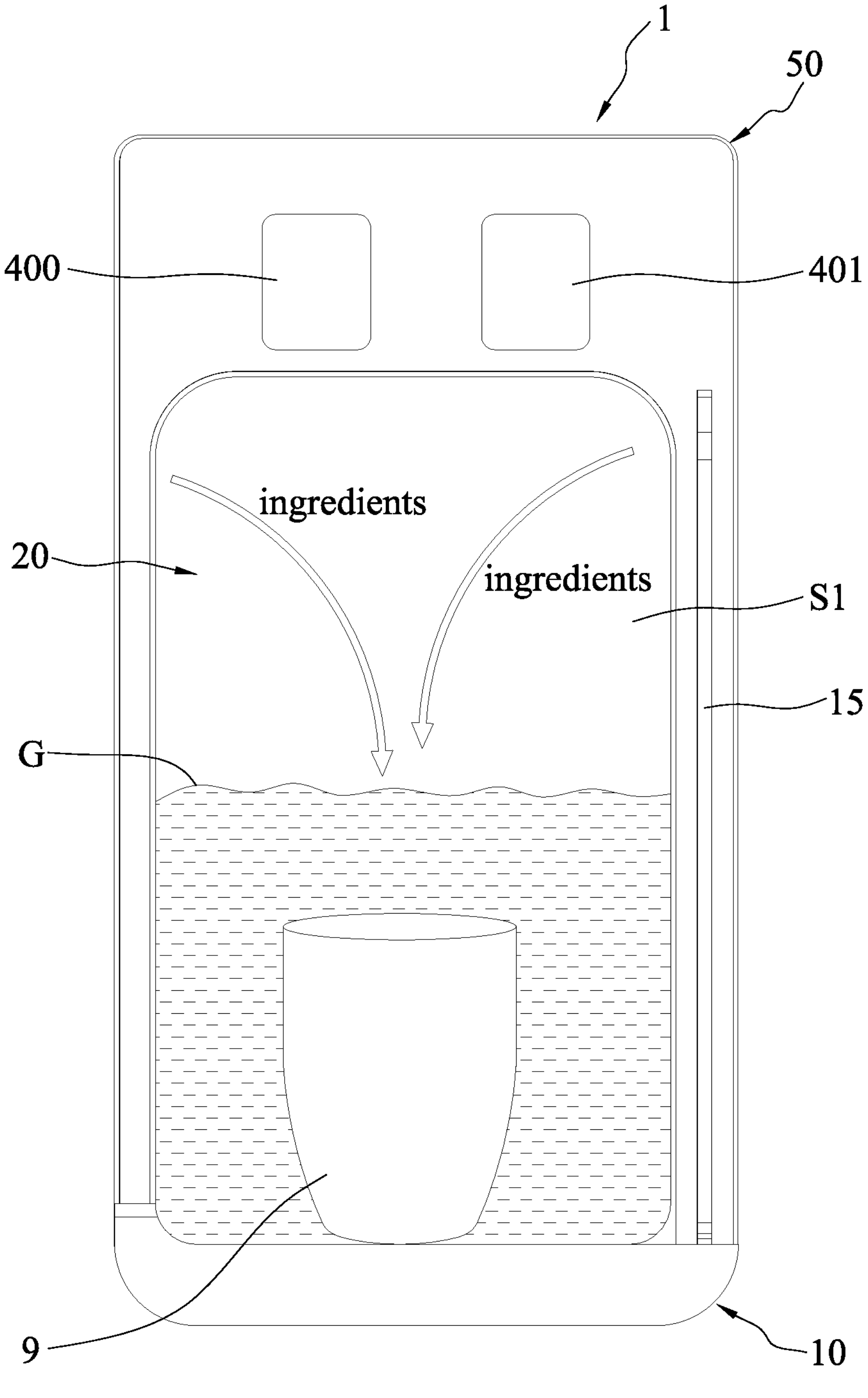

FIG. 4A and FIG. 4B are schematic views illustrating the operation of the liquid dispenser 1 having immersive motion graphics of the present disclosure, and are described with reference to FIG. 1, FIG. 2, FIG. 3A and FIG. 3B.

In one embodiment, a user presses the switch member 400 on the liquid dispenser 1 having the immersive motion graphics, in order to trigger the electrical control portion 40 in the liquid dispenser 1 having the immersive motion graphics to notify an external liquid supply device (not shown) to supply drinks, for example: providing directly drinkable beverages (such as cold water) or water and concentrates (such as juice concentrates) that have not been mixed into beverages to the liquid supply portion 30 in the liquid dispenser 1 having the immersive motion graphics, wherein if the liquid supply portion 30 receives the drink that can be directly consumed, the electrical control portion 40 will control the liquid supply member 31 to directly discharge the drink from the liquid injection port T in the liquid dispenser 1 having the immersive motion graphics; alternatively, if the liquid supply portion 30 receives water and concentrated liquid that have not been mixed into a beverage, the liquid supply portion 30 will mix the water and the concentrated liquid to produce a beverage, and the electrical control portion 40 then controls the liquid supply member 31 to discharge the beverage, so that the drink is poured into a cup (such as the target object 9) located on the object holder 13 and in the water filling area (i.e., the first accommodating space S1).

In another embodiment, the user can select the drink he/she wants to drink on the application (APP) of the mobile device, so that the application generates a two-dimensional barcode (such as QR code) with user information and liquid information (that is, information about beverages), and sends the two-dimensional barcode to the electrical control portion 40 via the scan member 401, and then, the electrical control portion 40 decrypts the two-dimensional barcode, and confirms whether the user information is correct and obtains the liquid information; alternatively, the electrical control portion 40 then transmits the two-dimensional barcode to a cloud server (not shown) via a wired network or a wireless network, so that the cloud server can decrypt the two-dimensional barcode, confirm whether the user information is correct and obtain the liquid information, and then send the liquid information back to the electrical control portion 40.

Furthermore, after the electrical control portion 40 obtains the liquid information, the electrical control portion 40 notifies an external liquid supply device (not shown) to supply drinks according to the liquid information, for example: providing drinks that can be directly consumed (such as cold water) or water and concentrates (such as juice concentrates) that have not yet been mixed into drinks, wherein if the liquid supply portion 30 receives the drink that can be directly consumed, the electrical control portion 40 will control the liquid supply member 31 to directly discharge the drink from the liquid injection port T in the liquid dispenser 1 having the immersive motion graphics; alternatively, if the liquid supply portion 30 receives water and concentrated liquid that have not been mixed into a beverage, the liquid supply portion 30 will mix the water and the concentrated liquid to produce a beverage, and then, the electrical control portion 40 controls the liquid supply member 31 to discharge the beverage, so that the drink is poured into the cup (e.g., the target object 9) located on the object holder 13 and in the water filling area (i.e., the first accommodating space S1).

At the same time, the electrical control portion 40 controls the warning light bar 15 on the liquid dispenser 1 having the immersive motion graphics to emit blue light to notify the user that the beverage flowing out is a cold beverage. Furthermore, the electrical control portion 40 further controls the display portion 20 (or another display portion) in the liquid dispenser 1 having the immersive motion graphics to display a motion graphic in the water filling area, or the electrical control portion 40 controls the projection member 123 to project the motion graphics on the display portion 20 (or another display portion) (as shown in FIG. 3B) to display the motion graphics in the water injection area. For instance, as shown in FIG. 4B, when the liquid dispenser 1 having the immersive motion graphics pours the beverage into the cup located in the water filling area, the interaction between the motion graphics displayed in the water filling area and the beverage is integrated into the display portion 20 (or another display portion), so as to form an integrated visual experience and provide users with an immersive experience when using the liquid dispenser 1 having the immersive motion graphics. For example, when the drink is poured into the cup, the display portion 20 (or another display portion) can display the generated motion graphics and simultaneously display the animation of the rise of the drink water level G, and display beverage information such as beverage ingredients, beverage filling amount and/or health tips via images and/or text.

In one embodiment, the target object 9 can be a transparent or translucent cup with light-transmitting and/or light-guiding properties, so that the motion graphics generated by the display portion 20 (or another display portion) perform color rendering on the target object 9 such as a transparent cup.

To sum up, the liquid dispenser having the immersive motion graphics of the present disclosure displays the motion graphics in the display portion located in the accommodating space (such as water injection area) when the liquid (such as a drink) is injected into the target object, so as to make the motion graphics interact with the liquid. In addition to displaying rich colors or geometric figures to further enhance the visual effect, the motion graphics can also display the corresponding nutrients (e.g., ingredients) in accordance with the water outlet process or the type of beverage. Compared with the labels of conventional food packaging regulations, consumers can be informed of rich beverage information and be provided with an immersive experience via the display of motion graphics.

The foregoing embodiments are used for the purpose of illustrating the principles and effects rather than limiting the present disclosure. Anyone skilled in the art can modify and alter the above embodiments without departing from the spirit and scope of the present disclosure. Therefore, the range claimed by the present disclosure should be as described by the accompanying claims listed below.

What is claimed is:

1. A liquid dispenser having immersive motion graphics, comprising:

a base portion including a frame member with a liquid injection port and an accommodating space formed in the frame member, wherein the liquid injection port communicates with the accommodating space;

a display portion disposed on the frame member, wherein the display portion is located in the accommodating space; and a liquid supply portion disposed on the base portion and having a pipe member connected to the liquid injection port for discharging a first liquid from the liquid injection port via the pipe member, wherein the display portion simultaneously displays a motion graphic in the accommodating space when the first liquid is injected from the liquid injection port into a target object disposed in the accommodating space and located in front of the display portion, such that the motion graphic interacts with the first liquid when the first liquid is injected into the target object, and wherein the motion graphic displays liquid ingredients of the first liquid and/or a health reminder via images and/or text.

2. The liquid dispenser having immersive motion graphics of claim 1, further comprising an electrical control portion disposed on the base portion and having a switch member and a scan member, wherein the switch member and the scan member are disposed on the frame member.

3. The liquid dispenser having immersive motion graphics of claim 2, wherein the electrical control portion is electrically connected to the liquid supply portion, and wherein when the switch member is triggered, the electrical control portion notifies a liquid supply device to supply the first liquid to the liquid supply portion, and controls the liquid supply portion to inject the first liquid into the target object via the liquid injection port.

4. The liquid dispenser having immersive motion graphics of claim 2, wherein the electrical control portion is electrically connected to the liquid supply portion, and wherein the electrical control portion notifies a liquid supply device to supply a plurality of second liquids to the liquid supply portion when the switch member is triggered, such that the plurality of second liquids are mixed in the liquid supply portion to obtain the first liquid, and the electrical control portion controls the liquid supply portion to inject the first liquid into the target object via the liquid injection port.

5. The liquid dispenser having immersive motion graphics of claim 2, wherein the electrical control portion is electrically connected to the liquid supply portion, and wherein when a two-dimensional barcode with a user information and a liquid information is scanned in the scan member, the electrical control portion decrypts the two-dimensional barcode to confirm whether the user information is correct and obtain the liquid information.

6. The liquid dispenser having immersive motion graphics of claim 5, wherein the electrical control portion notifies a liquid supply device to supply the first liquid to the liquid supply portion according to the liquid information, and the electrical control portion controls the liquid supply portion to inject the first liquid into the target object via the liquid injection port.

7. The liquid dispenser having immersive motion graphics of claim 5, wherein the electrical control portion notifies a liquid supply device to supply a plurality of second liquids to the liquid supply portion according to the liquid information, such that the plurality of second liquids are mixed in the liquid supply portion to obtain the first liquid, and the electrical control portion controls the liquid supply portion to inject the first liquid into the target object via the liquid injection port.

8. The liquid dispenser having immersive motion graphics of claim 2, wherein the electrical control portion is electrically connected to the liquid supply portion, and wherein when a two-dimensional barcode with a user information and a liquid information is scanned in the scan member, the electrical control portion transmits the two-dimensional barcode to a cloud server, and the cloud server decrypts the two-dimensional barcode to confirm whether the user information is correct and obtain the liquid information, and the cloud server sends the liquid information back to the electrical control portion.

9. The liquid dispenser having immersive motion graphics of claim 8, wherein the electrical control portion notifies a liquid supply device to supply the first liquid to the liquid supply portion according to the liquid information, and the electrical control portion controls the liquid supply portion to inject the first liquid into the target object via the liquid injection port.

10. The liquid dispenser having immersive motion graphics of claim 8, wherein the electrical control portion notifies a liquid supply device to supply a plurality of second liquids to the liquid supply portion according to the liquid information, such that the plurality of second liquids are mixed in the liquid supply portion to obtain the first liquid, and the electrical control portion controls the liquid supply portion to inject the first liquid into the target object via the liquid injection port.

11. The liquid dispenser having immersive motion graphics of claim 2, wherein the electrical control portion is electrically connected to the display portion, and wherein the electrical control portion controls the display portion to display the motion graphic when the first liquid is injected into the target object via the liquid injection port.

12. The liquid dispenser having immersive motion graphics of claim 2, further comprising a projection member disposed on the frame member and electrically connected to the electrical control portion, wherein when the first liquid is injected into the target object via the liquid injection port, the electrical control portion controls the projection member to project the motion graphic on the display portion, such that the display portion displays the motion graphic.

13. The liquid dispenser having immersive motion graphics of claim 2, further comprising a casing disposed on the base portion to protect the display portion, the liquid supply portion and the electrical control portion.

14. The liquid dispenser having immersive motion graphics of claim 1, wherein the target object is a material with light-transmitting and/or light-guiding properties, such that the motion graphic is able to pass through the target object and be displayed in the accommodating space.

* * * * *